Oct. 18, 1932.    W. P. SMITH    1,883,031
COMBINED STEERING AND BRAKING DEVICE FOR SLEIGHS
Filed May 25, 1931
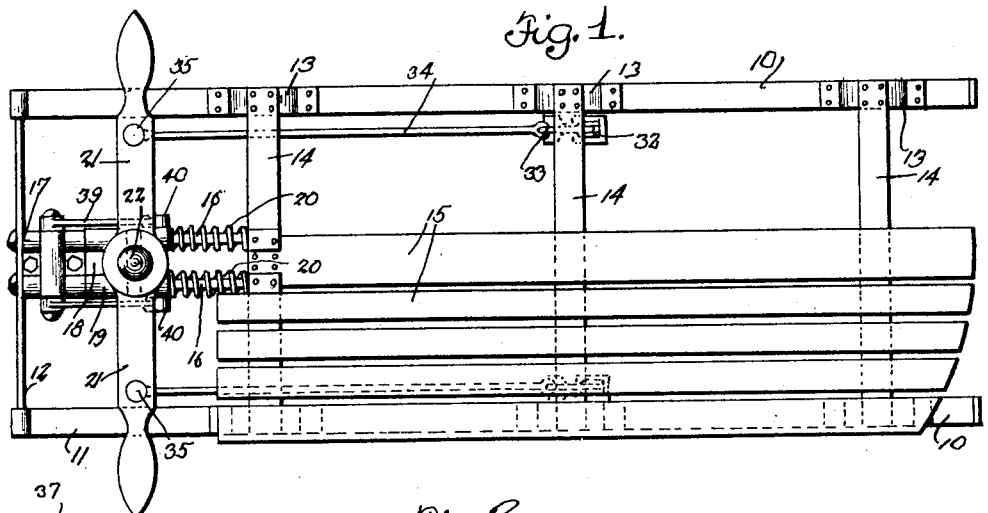
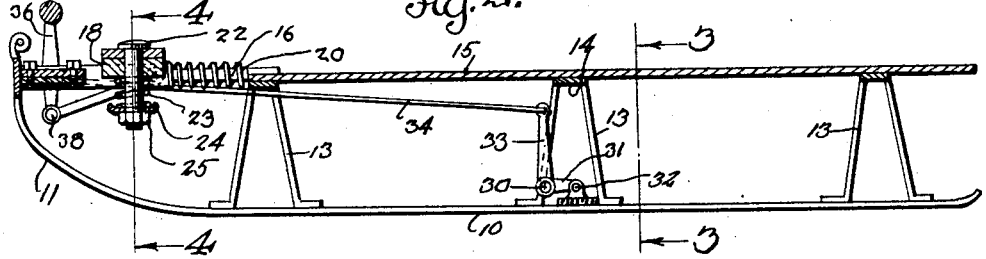
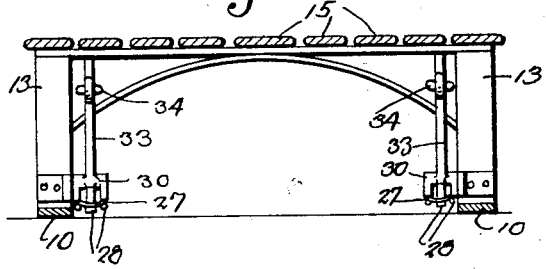
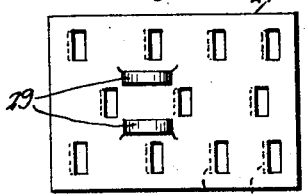
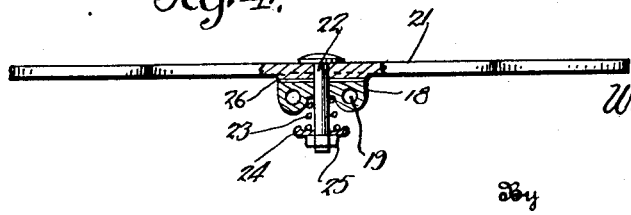
Inventor
Wilbert P. Smith.
By Bryant & Lowry
Attorneys Patented Oct. 18, 1932

1,883,031

UNITED STATES PATENT OFFICE

WILBERT P. SMITH, OF THOMASTON, CONNECTICUT, ASSIGNOR OF ONE-FOURTH TO JAN P. CLARY, OF HARTFORD, CONNECTICUT

COMBINED STEERING AND BRAKING DEVICE FOR SLEIGHS

Application filed May 25, 1931. Serial No. 539,931.

This invention relates to certain new and useful improvements in a combined steering and braking device for sleighs.

The primary object of the invention is to provide a combined steering and braking device for sleighs wherein a shoe member pivotally supported adjacent each sleigh runner has link connections with a pivoted transverse steering bar so that upon pivotal movement of the steering bar, either of the shoe members is shifted to operative position to retard movement of the associated runner and to act as a pivot in effecting a change in direction of travel of the sleigh.

A further object of the invention is to provide a combined steering and braking device of the foregoing character wherein the transverse steering bar is carried by a tensioned slide so that when the slide is shifted against spring tension thereon, both shoe elements are moved into operative braking position to retard forward movement of the sleigh.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a sleigh equipped with the combined steering and braking device with several of the body boards removed and illustrating the tensioned slide to which the transverse steering bar is pivotally connected;

Figure 2 is a vertical longitudinal sectional view, showing the link connection between the shoe elements and the steering bar and the operating means for the two elements;

Figure 3 is a cross-sectional view taken on line 3—3 of Figure 2, showing a shoe element associated with each runner;

Figure 4 is a cross-sectional view taken on line 4—4 of Figure 2, showing the centering device for the steering bar;

Figure 5 is an elevational view of one of the shoe elements;

Figure 6 is a top plan view of the shoe elements; and

Figure 7 is a vertical longitudinal sectional view of the shoe elements, showing ground engaging calks struck therefrom.

Referring more in detail to the accompanying drawing, there is illustrated a sleigh comprising side runners 10, curved upwardly at their forward ends in the usual manner as at 11 with the terminal ends of the curved portions connected by a transverse head rail 12. A series of braces 13 are secured at their lower ends to each runner 10 in spaced relation and rise therefrom with transverse bars 14 connecting the upper ends of transversely aligned braces, the bars 14 providing supports for the bed or body board 15.

As shown in Figures 1 and 2, a pair of spaced parallel rods 16 extend longitudinally of the sleigh and are supported at their rear ends on the forwardly positioned cross bar 14 while their forward ends are set into a block 17 attached to the head rail 12. A slide block 18 has parallel side bearings 19 to accommodate mounting of the same upon the rods 16 and said slide block 18 is held normally engaged with the block 17 by coil springs 20 surrounding the rods 16 between the forward cross-bar 14 and the slide block. A transverse steering bar 21 is journalled upon the upper side of the slide block 18 as shown in detail in Figure 4 through the medium of the bearing pin 22 that extends downwardly through the slide block 18 with the lower end of the pin 22 surrounded by a coil spring 23, the upper end of which engages the slide block, while the lower end thereof is engaged by a disk 24 retained on the lower end of the bearing pin by the nut 25. The opposed faces of the transverse steering bar 21 and the slide block 18 are provided with a freely disengageable interfitting tongue and groove 26 for normally holding the steering bar in its normal inoperative position extending transversely of the sleigh body, the tongue and groove connection being of a character to permit substantially free pivotal movement of the steering bar for operation thereof.

A steering and brake shoe is associated with each runner and as shown in Figures 5 to 7, each shoe comprises a metal stamping or the like in the form of a curved plate 27 having ground engaging calks 28 struck therefrom and extending downwardly with a pair of upstanding apertured ears 29 to facilitate mounting thereof. The mounting for the shoes includes a bell crank lever pivotally mounted as at 30 upon an intermediate brace 13 adjacent the lower end thereof, one arm 31 of the bell crank lever being pivotally connected as at 32 to the upstanding ears 29 upon the shoe, while the other arm 33 of the bell crank lever extending in an upward direction has a link connection 34 with the outer end of the steering bar 21 as at 35 at the adjacent side of the runner. When it is desired to change the direction of travel of the sleigh, the steering bar 21 is moved upon its pivotal mounting 22 and the desired shoe 27 is lowered into ground engagement and results in free running movement of the opposite runner to effect turning of the sleigh. The pivot support 32 for the shoe 27 is intermediate the front and rear ends thereof and the shoe is of a length whereby pivotal movement thereof when in ground engaging position will be prevented and clockwise movement of the levers 33 have a tendency to move the pivot point 32 closer to the ground line so that pivotal movement of the shoes will be prevented.

When it is desired to utilize the shoe members 27 as brake devices, both of the shoe members are simultaneously lowered into ground engagement and to accomplish this movement, a lever 36 normally extending in a vertical direction as illustrated in Figure 2, is pivoted upon the block 17 and has a hand or foot rest 37 at its upper end, the lower end of the lever 36 carrying a cross head 38, the opposite ends of which have a link connection 39 with the slide block 18 as shown at 40. The forward projection of the upper end of the lever 36 effects rearward sliding movement of the slide block 18 against the tension of the springs 20, the steering bar 21 being carried rearwardly with the slide block for operating the brake shoe elements 27 and simultaneously bringing them into ground engagement.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a combined steering and braking attachment for sleighs, a sleigh body, a block slidable thereon, a steering bar pivoted on the block, a lever supported shoe adjacent each runner, link connections between the shoe lever and steering bar, and a freely disengageable interfitting connection between the block and steering bar for normally holding the steering bar transversely positioned.

2. In a combined steering and braking attachment for sleighs, a sleigh body, a block slidable thereon, a steering bar pivoted on the block, a lever supported shoe adjacent each runner, link connections between the shoe lever and steering bar, springs associated with the slide block for holding the same at its limit of movement in one direction with the shoes elevated into inoperative position, manually operable means engaged with the block for moving the same to lower the shoes into operative position, and a freely disengageable interfitting connection between the block and steering bar for normally holding the steering bar transversely positioned.

In testimony whereof I affix my signature.

WILBERT P. SMITH.